(12) United States Patent
Givens

(10) Patent No.: US 6,302,178 B1
(45) Date of Patent: Oct. 16, 2001

(54) CARPET SEAMING TOOL

(76) Inventor: Richard J. Givens, 2200 Oak Grove Dr., Vinton, LA (US) 70668

( * ) Notice: Subject to any disclaimer, the term of this patent is extended or adjusted under 35 U.S.C. 154(b) by 0 days.

(21) Appl. No.: 09/500,976

(22) Filed: Feb. 15, 2000

(51) Int. Cl.[7] ............................................. B29C 65/18
(52) U.S. Cl. .................. 156/579; 156/304.4; 156/304.6; 156/304.7
(58) Field of Search .............................. 156/304.1, 304.2, 156/304.3, 304.4, 304.6, 304.7, 579

(56) References Cited

U.S. PATENT DOCUMENTS

| 5,210,394 | * | 5/1993 | Kerremans | ........................... 219/245 |
| 5,250,139 | * | 10/1993 | Hall | ...................................... 156/379 |
| 5,944,943 | * | 8/1999 | Kwok et al. | ........................... 156/356 |

* cited by examiner

*Primary Examiner*—James Sells
(74) *Attorney, Agent, or Firm*—Jack C. Munro

(57) ABSTRACT

A carpet seaming tool which is constructed to be of a heavy weight so as to exert a pressure against the carpet onto a carpet glue tape to facilitate bonding between the glue tape and the carpet. This carpet seaming tool is to facilitate connection, during non-usage, with a separate carpet seaming iron which is used to melt the glue on the carpet seaming tape. The carpet seaming tool includes a handle to facilitate movement of the tool along the carpet seam line during a seaming operation. The tool is constructed to eliminate the possibility of transfer of heat from the iron to the carpet which could result in damage to the carpet.

9 Claims, 1 Drawing Sheet

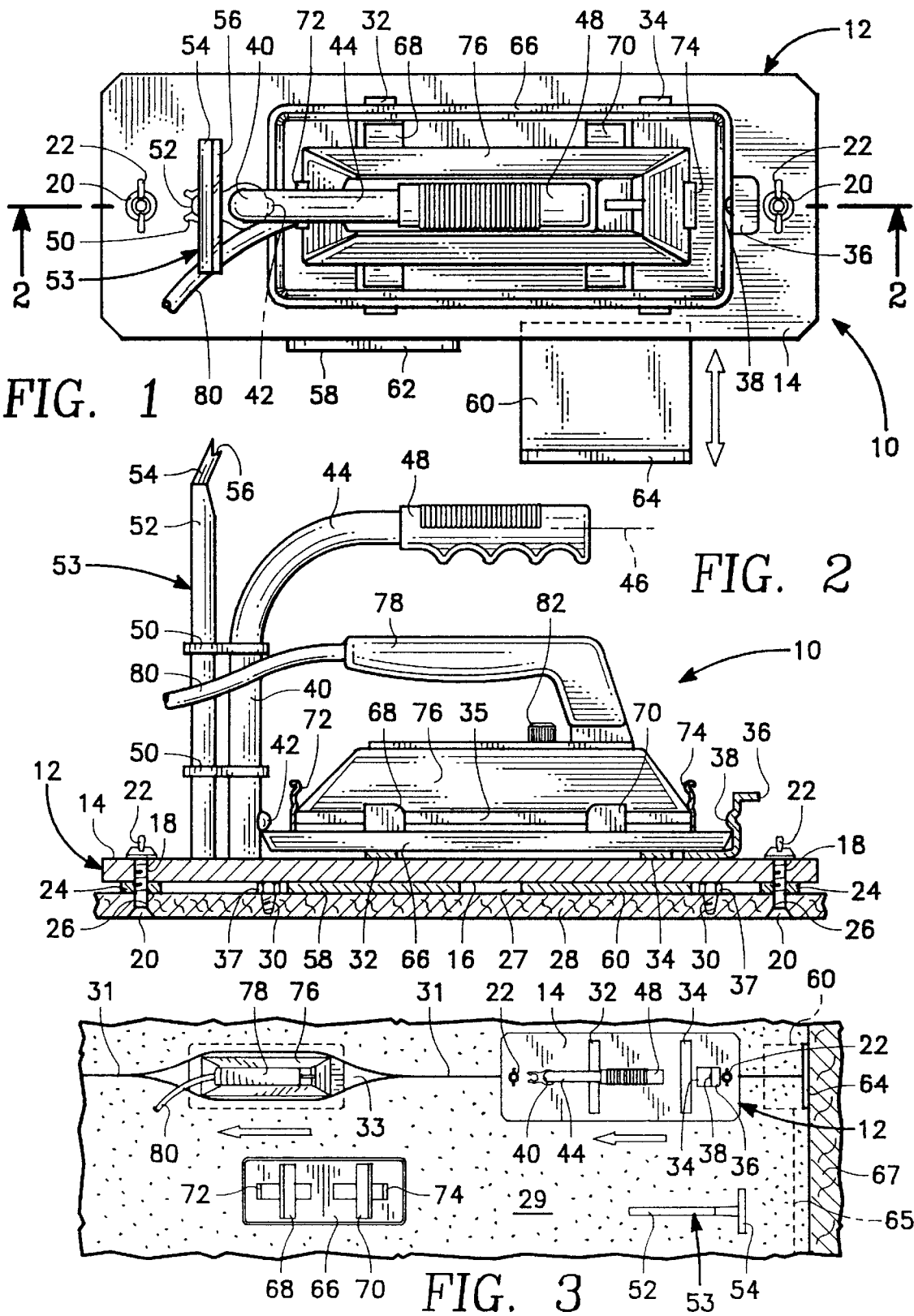

CARPET SEAMING TOOL

BACKGROUND OF THE INVENTION

1) Field of the Invention

The field of this invention relates to tools and more particularly to a tool which is designed to assist in the seaming operation between carpet strips which would be normally installed within a house or an office.

2) Description of the Prior Art

The carpeting of floors in homes and offices is quite common. During the installing procedure of this carpet, there is inherently formed a substantial number of seams to connect one portion of the carpet to another portion of the carpet and to give the appearance that the carpet is one continuous piece of material. The achieving of the seam is accomplished through the use of a seam tape. This seam tape includes an upper glued surface. When this glue becomes molten and the different carpet strips that are located in juxtaposition are pressed tightly onto the tape, it will be secured to the tape and, therefore, be joined.

In order to have the glue on the tape to become molten, there is utilized a heat seaming iron. This heat seaming iron is electrically operated to assume a temperature sufficient to melt this glue on the seaming tape. After the glue has been melted on one portion of the tape, the iron is moved onto a different portion of the tape and the carpet sections are pressed tightly onto the section of the tape where the glue had been melted.

In order to facilitate this connection, it is required to use some kind of a heavy weight to press onto the carpet. It is common for the carpet layer to locate a tool box, or other similar type of heavy object, on the carpet at the joined area. It is necessary that this tool box be constantly moved along the seam as different sections of the seaming tape are heated. A tool box is not normally easily movable and is also far heavier than what is required. Therefore, there is the need to design a tool which facilitates the seaming of a carpet and also facilitates the storage of the seaming iron during non-usage of the iron.

SUMMARY OF THE INVENTION

The structure of the present invention is related to a tool to be utilized during the seaming together of two portions of carpet. The tool comprises a planer, non-heat conductive supporting platform upon which is mounted a seam weight which is also in the form of a thin planer member. This seam weight is to be constructed as heavy as possible and, therefore, will normally be metal. The platform is removably secured to the seam weight in a spaced apart manner forming an air gap therebetween. Attached to the upper surface of the seam weight is a mounting arrangement. This mounting arrangement facilitates temporarily securing of a carpet seaming iron assembly which includes its own metallic mounting base fixedly attached to the upper surface of the seam weight. This handle is to be usable to facilitate movement of the tool across the carpet seam as it is being used. On the bottom of the handle are a pair of clips. These clips are to connect with a tack strip removing tool. This tack strip removing tool is to be usable to remove the carpet tack strip (if necessary) which is mounted directly onto the floor upon which the carpet is being layed. A pair of edge plates are to be mounted, when not in use, within the air gap formed between the seam weight and the supporting platform.

The primary objective of the present invention is to construct a tool which is to be usable by a carpet layer which assist in the forming of tight seams between sections of the carpet.

Another objective of the present invention is to construct a tool which provides for a location of the carpet seaming iron when such is not being used to thereby avoid the accidental creating of a burn sport within the carpet by the carpet seaming iron.

Another objective of the present invention is to construct a tool which is in essence constructed of multiple tools which form a complete tool package for the seaming of carpet.

BRIEF DESCRIPTION OF THE DRAWINGS

FIG. 1 is a top plan view of the carpet seaming tool of the present invention showing the carpet seaming iron being mounted in conjunction therewith;

FIG. 2 is a cross-sectional view taken along line 2—2 of FIG. 1; and

FIG. 3 is a top plan view showing the tool of the present invention in a disassembled state and depicting usage of the tool in conjunction with the carpet seaming iron.

DETAILED DESCRIPTION OF THE PREFERRED EMBODIMENT

Referring particularly to the drawing, there is shown the carpet seaming tool 10 of this invention. This tool 10 includes a basically rectangularly shaped thin sheet-like member to be referred to as a seam weight 12. Normally the thickness of the seam weight 12 will be about one-half inch or 1.27 centimeters. It is desirable that the seam weight 12 be reasonably heavy in weight. For this reason, the seam weight 12 will be constructed of a metal material such as iron. A desirable weight would be twenty to twenty-five pounds. This seam weight 12 has an upper planer surface 14 and a lower planer surface 16 with these surfaces 14 and 16 being parallel.

Formed within the back end section of the seam weight 12 is a hole 18 with a similar hole 18 being formed within the front end section of the seam weight 12. Mounted within each hole 18 is a fastener 20 with it being understood that there is a separate fastener 20 for each hole 18. The outer free end of each fastener 20 connects with a wing nut 22. The wing nuts 22 are to abut against the upper surface 14. Each of the threaded fasteners 20 are conducted through a washer 24. The inner end of each of the fasteners 20 are each directed through a hole 26 formed within a supporting platform 28. The washers 24 function to maintain a slight space between the supporting platform 28 and the seam weight 12. This slight space is an air gap 27. The function of the air gap 27 is to minimize the possibility of transfer of heat by conduction from the seam weight 12 to the supporting platform 28. This supporting platform 28 is to rest directly on the carpet 29. This supporting platform 28 is to be constructed of a non-heat conducting material such as wood. The fact that there are minimal areas of connection between the seam weight 12 and the supporting platform 28, the possibility of conducting of any appreciable amount of heat therebetween is eliminated.

To avoid any skewing of the supporting platform 28 relative to the seam weight 12 there are threadably secured into the supporting platform 28 a plurality of screw fasteners 30. The heads 37 of these fasteners 30 are located within the air gap 27. The thickness of the heads 37 of these fasteners 30 is equal to the spacing of the air gap 27. Therefore, by using of a plurality of these fasteners 30 located in a spaced apart manner, the thickness of the air gap 27 is maintained constant.

It is to be noted that if it is desired to replace the supporting platform 28 by reason of it becoming damaged over a period of time, it is only necessary to disengage the wing nuts 22 which will permit the supporting platform 28 to be separated from the seam weight 12. At this particular time, a new supporting platform 28 can be reinstalled in conjunction with the wing nuts 22.

Fixedly mounted on the upper surface 14 are a pair of spaced apart U-shaped brackets 32 and 34. These brackets 32 and 34 are located in a parallel relationship with the respect to each other. Each end of each bracket 32 and 34 is upturned. It is the function of these upturned ends to provide lateral restraint for mounting base 66. This mounting base 66 functions as a tray with the back end of such to be located under a knob 42 mounted on an upstanding post 40 and the front end of which is under knob 38 formed on a deflectable plate member 36. This deflectable plate member 36 is fixedly mounted onto the upper surface 14 of the seam weight 12. By manually pushing in a downward direction the deflectable member 36 toward the seam weight 12, the knob 38 can be disengaged from the mounting base 66 which will then permit the mounting base 66 to be completely separated from the brackets 32 and 34. This separation is clearly shown in FIG. 3 of the drawing. It is to be noted that the mounting base 66 is deemed to be conventional with only the tool 10 of this invention being constructed in a manner to provide a storage area for the base 66 when the base 66 is mounted in conjunction with the brackets 32 and 34. It is to be noted that there is formed an air gap 35 between the mounting base 66 and the upper surface 14 of the seam weight 12. This air gap 35 minimizes the transfer of heat between the mounting base 66 and the seam weight 12.

The post 40 is fixedly secured to the upper surface 14 of the seam weight 12. The outer end of the post 40 is deflected at substantially a right angle forming a handle member 44. This handle member 44 has a longitudinal center axis 46. Mounted on the handle member 44 is a resilient hand grip 48 which is to facilitate manual grasping thereof. The grip 48 is located substantially directly over the center of gravity of the tool 10. Therefore, when the grip 48 is grasped and a lifting motion is imparted to the tool 10, the tool 10 will not have a tendency to twist from the lifted position and will remain in the position shown substantially in FIG. 2 of the drawing.

Fixedly mounted on the posts 40 are a pair of clips 50 located in a spaced apart manner. Connectable with the clips 50 is an elongated handle 52 of a separate tack strip removing tool 53. The outer end of this tool 53 is formed into a head 54 which includes an elongated channel 56. It is to be noted that the transverse dimension of this channel 56 is inclined relative to the longitudinal center axis of the elongated handle 52.

It is to be understood that this tool 53 is to be disengaged from the brackets 50 and then to be used by locating a portion of a carpet tack strip 65 within the channel 56. The tool 53 is then moved in a prying manner to remove the tack strip 65 from its attached position on the floor (not shown). It is to be understood that the clips 50 function to merely provide a storage location for the tool 53 when not in use.

Also located in a storage position in the air gap 27 is a pair of edge plates 58 and 60. Edge plate 58 includes an upturned flange 62 with edge plates 60 also including a similar upturned flange 64. The edge plates 58 and 60 are identical in construction.

Referring particularly to FIG. 3 of the drawing, there is shown the tack strip 65 in phantom. This tack strip 65 is fixedly secured to the floor with the upper surface of this tack strip 65 having a plurality of small sharp pointed protruding nail-like members. It is the function of the tack strip 65 to provide an outer edge securement for the carpet 29 adjacent the wall 67.

When it is desired to seam together different sections of the carpet 29 along seam line 31, the seam tape 33 is layed against the floor with the glued upper surface being located directly against the undersurface of the carpet 29. This seam tape 33 is located along the seam line 31. To have the different sections of the carpet 29 be secured to the seam tape 33 directly adjacent the wall 67 is difficult because of the location of the tack strip 65. To make this job easier, the edge plate 60 is slipped between the carpet 29 and the tack strip 65 forming a smooth surface against which to operate the seaming of the carpet in this area. The seaming iron 76, which has been heated by electricity from electrical conductor 80, is positioned manually through the use of handle 78 directly against the glued surface of the seam tape 33 that is located on the edge plate 60. The heating temperature of the iron 76 can be increased or decreased by turning of knob 82. Once the glue on the seam tape 33 has been melted, the iron 76 is then moved to a new position on the seam tape 33 with the carpet being pressed tightly against the edge plate 60 and held in that position for a short period of time until the glue solidifies securing together the seam tape 33 and the carpet 29 in this particular area. At this particular time, the user grasps the flange 64 and removes the edge plate 60 and then locates the edge of the carpet sections 29 into tight engagement with the spikes of the tack strip 65. Thereby the carpet sections 29 are fixedly secured in place along the edge of the wall 67.

As the iron 76 continues to melt the glue on the seam tape 33, the carpet sections 29 are pressed tightly against the melted glue sections and are to remain that way until satisfactory securement has occurred. To assist in this securement, there is utilized the tool 10 of this invention which, because of its inherent weight, when located on top of the carpet 29 in the area of the melted glue, will press the carpet sections 29 against the seam tape 33 insuring that a satisfactory securement is obtained. As the iron 76 is moved to a new spot to again melt more of the adhesive on the seam tape 33, the tool 10 also similarly moved progressively along the seam line 31 to now apply pressure to the newly melted glue area.

When the iron 76 reaches the end of the seam line 31, the iron 76 is to be located on brackets 68 and 70 of the mounting base 66. A deflectable tab 72 abuts against the rear edge of the iron 76 with a similar deflectable tab 74 abutting against the front end of the iron 76. In essence, the iron 76 will snap "into" and "out of" place in regard to the mounting base 66. When the iron 76 has reached the end of the seam line 31, the fact that it is positioned in conjunction with the tool 10 will prevent the iron 76 from being located directly onto the upper surface of a portion of the carpet 29 which could cause the carpet 29 to be burned. Even if the iron 76 remains for an extended period of time on the mounting base 66 and this mounting base 66 is in position on the seam weight 12, no significant transfer of heat by conduction occurs which could damage the carpet 29.

What is claimed is:

1. In combination with a carpet seaming iron, said iron to be used at a heated temperature, a mounting base, said iron to be located on said mounting base during non-usage, a carpet seaming tool comprising:

a supporting platform being constructed of a non-heat conductive material, said supporting platform adapted to rest against carpet;

a seam weight having a bottom surface and an upper surface, said seam weight being fixedly mounted to said supporting platform with said bottom surface being located directly adjacent said supporting platform, said seam weight being constructed of heavy material;

mounting means secured to said seam weight at said upper surface, said mounting base to be removably secured to said mounting means, with said mounting base secured to said mounting means said mounting base is located in a spaced relationship from said upper surface forming a first air gap; and a handle, said handle being mounted on said upper surface, said handle being graspable to facilitate sliding movement of said tool along the carpet.

2. The combination as defined in claim 1 wherein:

said seam weight being secured in a spaced relationship relative to said supporting platform forming a second air gap, the purpose of said second air gap as well as said first air gap is to minimize the conducting of heat from said seaming iron to said supporting platform.

3. The combination as defined in claim 2 wherein:

said supporting platform comprising a sheet material planer member, said seam weight comprising a sheet material planer member, the peripheral edge of said supporting platform being in alignment with the peripheral edge of said seam weight.

4. The combination as defined in claim 1 wherein:

said supporting platform being removably mounted to said seam weight.

5. The combination as defined in claim 4 wherein:

said supporting platform being constructed of wood.

6. The combination as defined in claim 5 wherein:

said seam weight being constructed of metal.

7. The combination as defined in claim 1 wherein:

said handle having a grip section, said grip section having a longitudinal center axis, said longitudinal center axis being located substantially parallel to said upper surface of said seam weight.

8. The combination as defined in claim 1 including:

said handle including clip means, said clip means to facilitate connection with a tack board removing tool.

9. The combination as defined in claim 2 including:

at least one edge plate associated with said carpet seaming tool, said edge plate to be storable during non-usage within said second air gap.

\* \* \* \* \*